(12) United States Patent
Thearling

(10) Patent No.: US 6,240,411 B1
(45) Date of Patent: May 29, 2001

(54) INTEGRATING CAMPAIGN MANAGEMENT AND DATA MINING

(75) Inventor: Kurt Thearling, Cambridge, MA (US)

(73) Assignee: Exchange Applications, Inc., Boston, MA (US)

( * ) Notice: Subject to any disclaimer, the term of this patent is extended or adjusted under 35 U.S.C. 154(b) by 0 days.

(21) Appl. No.: 09/097,875

(22) Filed: Jun. 15, 1998

(51) Int. Cl.$^7$ ....................................... G06F 17/30
(52) U.S. Cl. ..................................... 707/5; 707/6
(58) Field of Search ............................ 707/5, 6; 706/12

(56) References Cited

U.S. PATENT DOCUMENTS

| | | | |
|---|---|---|---|
| 5,692,107 | * 11/1997 | Simoudis et al. | 706/12 |
| 5,754,939 | * 5/1998 | Herz et al. | 455/4.2 |
| 5,950,189 | * 9/1999 | Cohen et al. | 707/3 |
| 5,953,718 | * 9/1999 | Wical | 707/5 |
| 5,974,412 | * 10/1999 | Hazlehurst et al. | 707/3 |
| 5,983,220 | * 11/1999 | Schmitt | 707/5 |
| 6,052,693 | * 4/2000 | Smith et al. | 707/104 |
| 6,121,969 | * 9/2000 | Jain et al. | 345/355 |

OTHER PUBLICATIONS

Exchange Applications, ValEx User Guide.
Bayer, J., Ceres Integrated Solutions, "Automated Response Modeling System for Targeted Marketing", (1998).
Campanelli, M., "AMS Forms Strategic Alliance with SAS Institute", Press Release, (1998).
Versatility Inc., "Versatility Campaign Plus", (1998).

\* cited by examiner

*Primary Examiner*—Wayne Amsbury
(74) *Attorney, Agent, or Firm*—Wolf, Greenfield & Sacks, P.C.

(57) ABSTRACT

Method and apparatus are disclosed for integration of campaign management and data mining. The method and apparatus disclose incorporating references to data mining models into the campaign management process. In some embodiments, this permits evaluating the data mining model for fewer than all of the records in a database, potentially saving computation time. The method and apparatus can include building queries for a database or ranking criteria for records in a database that include a reference to a data mining model.

27 Claims, 11 Drawing Sheets

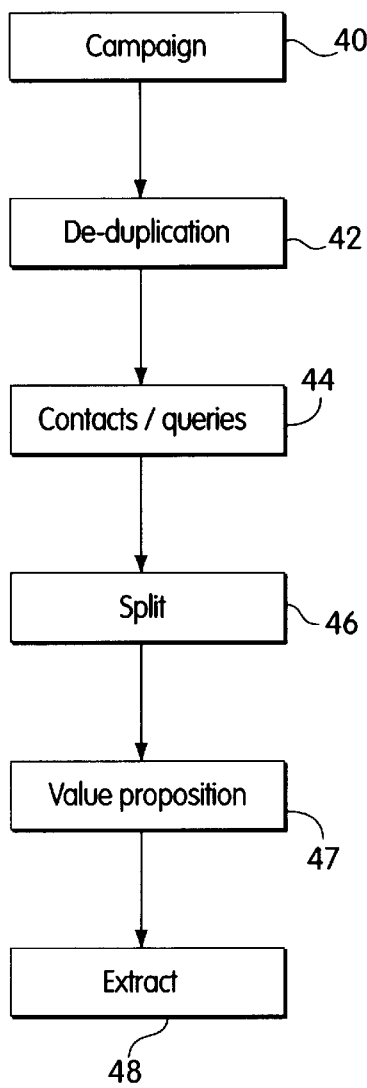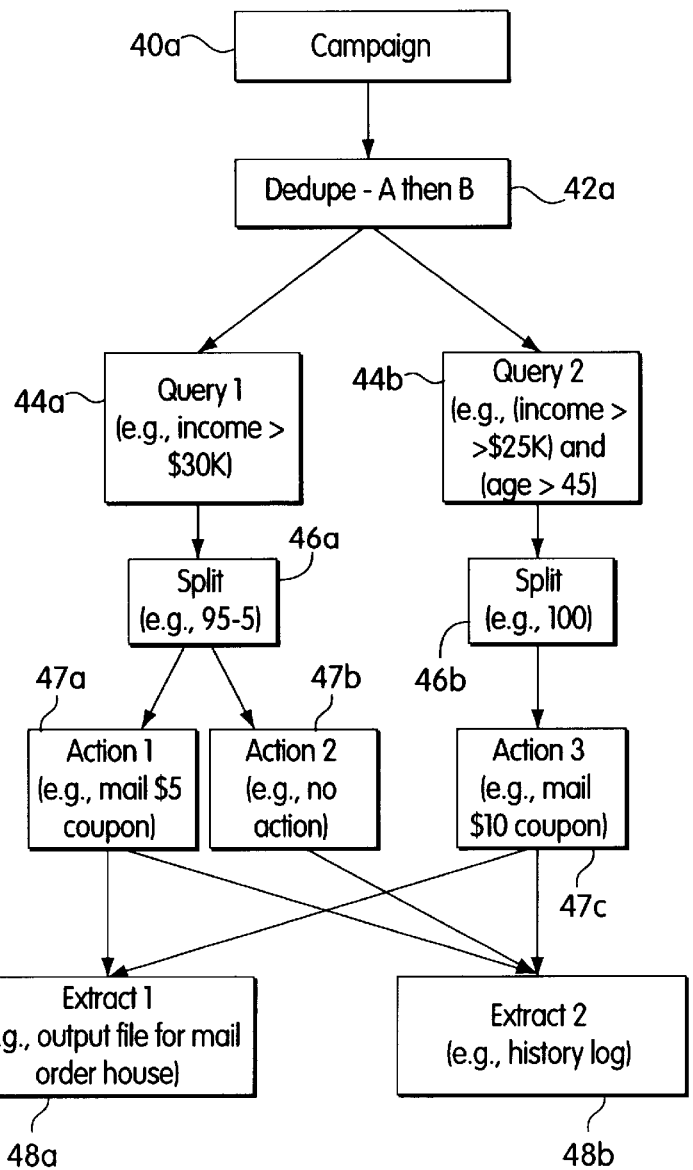
Fig. 4A (Prior Art)
Fig. 4B (Prior Art)

INTEGRATING CAMPAIGN MANAGEMENT AND DATA MINING

FIELD OF THE INVENTION

The invention relates to methods and systems for analyzing and selecting records stored in a computer database, and more particularly, to methods and systems for integrating the modeling of new characteristics of records and selection of records from a database.

DISCUSSION OF THE RELATED ART

Computer databases have proliferated. For example, extremely large databases (or "data warehouses") have been generated for marketing data. While this data may be easy to compile (in some applications), using the information to achieve a goal can be challenging.

A database may be thought of as including one or more tables, with rows of the table corresponding to individual records in the database. For example, in the database 13 of FIG. 1A, the first row 19a indicates the labels for fields of the overall table 15. The term "table" refers to any group of associated records, whether stored in actual table format or otherwise. Each of the rows 19b–19e is an individual record corresponding to an individual person (in this example). The term "record" includes any associated set of fields (e.g. the fields in row 19b of FIG. 1A). Thus, in row 19b, a person has a name "1" (column 17a), an age of 65 (column 17b), and an income of $60,000 (column 17c). While the description of the invention may be provided with reference to records (e.g. 19b–19e of FIG. 1A) within a table 15 in a database 13, this is not intended as limiting. The present invention has application for analysis and selection of stored information in a database, no matter what the particular internal representation is. The database may be digital information stored in any digital storage medium, such as conventional random access memory, tape storage, CD-ROM, and others.

The database may be built using a great variety of information for each corresponding component or record of the database. For example, in a database where the records correspond to individuals, the individual's age, address, and income may be readily available information for input to the database. These individual fields, however, may not be meaningful for determining any action in the future. For example, if a business wishes to send out a targeted mailing, the business would like to estimate which of the records in a database of individuals corresponds to individuals who are likely to respond favorably to the targeted mailing. Simple analysis of the available fields in the database (e.g., age, income, and others) may not be sufficient to perform this task.

Accordingly, a number of techniques have been developed for manipulating the known fields (i.e., the characteristics recorded in the database, corresponding to the columns 17a–17c, i.e., name, age, and income) to determine a new characteristic (e.g., field) that is more meaningful. Such techniques include those referred to in the art as "data mining."

FIG. 1B illustrates one way (of a number of ways) of developing a new field for the database. A database 10 is provided that includes both training data 11 and test data 12. The training data 11 is a table (including a number of records). The training data is provided to a model builder 14. The model builder 14 may be software running on general purpose computer. Examples of commercially available packages that may be used for a model builder 14 include: Enterprise Miner (and standard SAS modeling software found in SAS/Base, SAS/STAT, etc.), available from the SAS Institute ("SAS") of Cary, N.C.; the SPSS program available from SPSS of Chicago, Ill.; Intelligent Miner available from IBM of Armonk, N.Y.; Darwin, available from Thinking Machines of Burlington, Mass.; Modell, available from Unica of Lincoln, Mass.; NeuralWorks Predict, available from NeuralWare, of Pittsburgh, Pa.; and MineSet, available from Silicon Graphics of Mountain View, Calif. The model builder 14 may also be a custom or semi-custom design for implementing a model, such as a hardware implementation of a neural-network.

The model builder 14 constructs a model 16. The model 16 may be some general method or technique for computing a new value or other parameter based on one or more fields within the record of the training data 11. The model 16 may, for example, be a statistical analysis or mathematical equation for computing a probability (for example, the probability that a customer would respond favorably to a mailing), a true/false field, or any other numerical, alphanumeric or other result. The model 16 may also produce more than one field. For example, the model might result in calculation of both a determination that a market is going up and a confidence level that the market is going up.

The result of the model or new field may be referred to as a "score." Thus, the table 33 and the database 30 includes a column 32 entitled "score." This score may have been determined by a model that was built according to the technique generally illustrated with respect to FIG. 1.

Once the model builder 14 has arrived at a model 16, an evaluator 18 may then assess the usefulness of the model 16. This may be done by examining the results of application of the model 16 to a separate database table 12 that includes test data, stored in the database 10.

The evaluator 18 may also be a software module implemented on a general purpose computer. Existing software to perform this function is known in the art. SAS and SPSS, described above, are both general statistical tools that can be used to evaluate a model. In addition, many data mining tools (including most of these listed above) also have evaluation functionality built into the software, and may be incorporated as a common part of a software package with the model builder 14.

Once a model has been constructed and selected for use, as generally described above with reference to FIG. 1B or in some other matter, the model may be applied to other databases.

FIG. 2 illustrates an example of application of a model to a database 20. The model 26 is fed to a model engine 22. For example, the model 26 may be an executable file that can be applied by the model engine 22. The model engine 22 takes as an input a database 20. The database 20 may be a database such as that shown at 15, but including only columns 17a–17c.

The model engine 22 may then apply the model to each record in the database 20 to produce a modified database 24. This modified database 24 would include the results of application of the model 26 to the database 20. Thus, the modified database 24 could be a table that includes an extra field (or column) that specifies the results of application of the model (or a separate table storing a key and a score, which can be joined with other tables). For example, in table 33 of FIG. 3, application of the model 26 could have resulted in a score, which is added to the table 33 in the last column 32d. Each record (e.g. 31b–31e) receives a corresponding calculated model value (e.g. rows 31b–31e in column 32d).

FIG. 3 illustrates one method of using a database in order to achieve certain goals. The database 30 includes a table 33.

The table 33 may be as generally described above, i.e., including a number of individual records corresponding to persons (households, businesses, entities or anything else), e.g., rows 31b–31e, in a number of fields for each record (corresponding to 32a–32d). (While illustrated as a single table 33, this may actually be stored in multiple tables, joined by a key.) One or more of the fields may correspond to a characteristic computed according to one of the above models generated through data mining or other technique, e.g. column 32d having a score.

The table 33 may be provided to a campaign manager 34. The purpose of campaign management is to select and categorize the records of the database (e.g., a corresponding row, such as 31b, 31c, 31d or 31e) for a variety of actions (or create a "segment" or segments of the database for action). A "campaign management system" is a system that can perform this function. In such a system, individual rows (e.g., potential customers) may be selected for one or more of actions 36a–36d. For example, action 1 36a may correspond to sending a person a coupon through the mail. Action 2 36b may correspond to making a telephone call to the individual. Action 3 36c could be storing the record in a history log.

In this example, the purpose of the campaign manager would be to select which of the records 31b–31e should be sent to which of the action items 36a–36d. Thus, based on the selection criteria, person "1" (row 31b) may receive a coupon through the mail, while person "3" (row 31b) receives the telephone solicitation (e.g., action 2 36b). All of the records may be stored in a promotional log as a part of action 3 36c.

A number of campaign management systems are known in the art. One example is the VALEX™ software available from Exchange Applications™, LLC, of Boston, Mass. Other examples include: One-by-One, available from Paragren of Reston, Va.; PRIME VANTAGE, available from Prime Response of Brentford, UK (US: New York, N.Y.); IRE Marketing Warehouse, available from Harte Hanks of Billerica, Mass.; Quiddity, available from May & Speh of Downers Grove, Ill.; and Epsilon Campaign Manager, available from Epsilon of Burlington, Mass.

The campaign management system may be implemented using a software program implemented on a general purpose computer. Of course, special hardware implementations or hardware component designs could be used.

FIGS. 4A and 4B illustrate one way of performing a campaign management process. The process begins at a step 40, where a campaign is formed. This corresponds to supplying a table (e.g., 33 of FIG. 3) to a campaign manager (34 of FIG. 3). In the corresponding example of FIG. 4B, a campaign process has simply begun at 40a.

At a step 42, a de-duplication (or "dedupe") may be performed. This step may be best understood with the following step, 44, where queries are performed. A query is an inquiry, in any form, that can be used to classify or sort records. The queries step 44 may involve different ways of defining subsets of records in an input database. Thus, in FIG. 4B, a query 1 44a might take all records for persons with an income over thirty thousand dollars. A second query 44b might select records of the database that have an income of over twenty five thousand dollars and an age of over 45. In this particular example, a person who is over 45 and has an income of over thirty thousand dollars would satisfy both the first query and the second query. One alternative for handling this is to permit records to follow both paths of the decision tree illustrated in FIG. 4B. That is, a record for a person having an age over 45 and an income over thirty thousand dollars would follow the analysis proceeding from both steps 44a and 44b of FIG.4B.

An alternative, however, is to require that each record in the database follow at most only one of branches corresponding to the queries 44a and 44b. In this way, duplication of the records is avoided in the query process. Here, the Dedupe step 42a might take all of the persons satisfying the first query 44a and have those processed only according to that branch of the decision tree. Those records (and only those records) that do not satisfy the first query 44a would then be tested under the second query 44b. In effect, therefore, the second query 44b would only include records with fields having an income of more than twenty five thousand dollars per year but less than (or equal to) thirty thousand dollars per year and an age of over 45.

After the query stage 44, a split step may be performed. In the split step, the records that satisfy any applicable preceding query or queries may be divided. The division may, for example, be a random division based on percentage. Thus, at step 46a of FIG. 4B, a random 95% to 5% split is performed. At step 46b, no split is effectively performed—all of the records satisfying the second query at 44b are passed along through the step illustrated at 46b.

At a step 47, the various records of the database have been divided into groups that are ready for action. Thus, for example, at a step 47a, a first value proposition may be formed, such as mailing a five dollar coupon. Accordingly, any record passed to step 47a would be assigned a value corresponding to the mailing of a five dollar coupon. At a step 47b, an alternative action might be to take no action at all—and any record falling into this class would be assigned a value corresponding to taking no action. Finally, at a step 47c, a value of mailing a ten dollar coupon could be assigned.

After the corresponding values have been assigned, at step 47, an extract step 48 may be performed. According to this step, one or more output files (or tables) may be formed. The output files may be records (or portions of records) associated with the applicable action assigned at the value proposition step 47. For example, a first extract for 48a may be formed in the example of FIG. 4B for providing a file to a mail order house that would arrange for mailing of appropriate coupons. In this case, an output data file could be formed that includes the name, an address field, and the particular value proposition (i.e. mailing a five dollar or ten dollar coupon). This output file could then be provided to the appropriate facility for taking the assigned action.

A second possible extract would be to simply log all of the records that were processed through the particular campaign, i.e., form a history log.

The general campaign management process (whether or not corresponding to the particular example described above with reference to FIGS. 4A and 4B), can be implemented using software on a general purpose computer, such as a personal computer. Similarly, campaigns can be built using one or more graphical user interfaces. For example, a graphical interface could permit users to graphically build campaign trees such as the one illustrated in FIG. 4B.

As described with reference to FIG. 4A, a part of the campaign management process is selecting subsets (or "contacts") for further processing (at steps 46–48).

FIG. 5 illustrates one graphical interface for constructing a query. This interface is available in the VALEXυprogram sold by Exchange Applications of Boston, Mass.

The screen 50 may be displayed on the screen of a general personal computer, or any other computer. The screen may include a set of fields 51, such as available in conventional software programs. For example, there may be a file field, an edit field, a view field, an options field, a tools field and a help field.

Some or all of the possible commands that can be entered may also have push button interfaces 52. Thus, a new document could be opened or the existing query saved by pressing an applicable button on the tool bar 52.

The interface may include an area for selecting the form of the current query being editing or constructed, as illustrated at 53a. The view shown in FIG. 5, as illustrated at 55, shows a visual form of a query, e.g., a simple form of query examining two fields within a table—age (to be greater than 25) and income (to be greater then thirty thousand dollars per year). An alternative is to show the current query being edited or constructed as a series of SQL (standard query language) statements.

A tool for editing query types 53b may also be included. This tool would permit a user to specify the type of record that is being examined in the particular query (or, the type of record selected within a subset generated as the result of the query). For example, the query type may focus on selection of particular customers within a table of customers, as in the example of FIG. 3. Any other possibility could be used for a query type, e.g., transactions, households, or items.

The graphical interface 50 may also include a table selection tool 53c. This permits the user to select a table within the user's database for examination. Thus, the user's database may include a number of tables (including redundant or overlapping information and coordinated by a key). For example, a database might include a table that includes only customer names and the associated income while another table might include only customer names and corresponding addresses.

A display area 55 may display the current query being edited or created.

Additions or alterations to the current query being edited can be done with a separate pop-up tool bar 54a–54h. Thus, a cursor marker (not shown) present in the current query 55 could indicate where additional query language commands could be inserted.

One tool 54a can be used for generating a comparison between a field of the table being examined and a specified value. One example of a field—operator—value query is shown at 55. The age field of the database is compared with a specified value—"25".

A "field-operator-field" tool 54b may be invoked by depressing the button 54b. This would permit the user to create a comparison of one field of a database with another field, e.g., creating a comparison of the age field and the income field for records within a database.

A "query" tool button 54c might permit a user to import a saved query into the present query being edited.

A "comment" button 54d might permit a user to invoke a comment function that would allow the user to make comments related to the query—such as memorializing why the query was structured as it was.

An "SQL" button 54e might allow a user to input SQL statements as a part of the query being generated 55.

An "and/or" button 54f may be used to prevent a user to input an and statement (such as the one indicated at 55) or an or statement.

A "not" tool button 54g could permit a user to input a not statement, corresponding to the Boolean operation not.

A "group by/having" button 54h that would permit a user to invoke a "group by/having" tool. This button could be used to permit a user to aggregate values within a field for a particular record. For example, if the record corresponds to a customer, the "group by/having" tool could be used to create an aggregation (or average or maximum or minimum, etc.) of all of the purchases that the customer has made. Here, for example, the group by/having tool could be used to aggregate the sum of purchases and test whether that sum is more than one thousand dollars.

Of course, other interfaces and other tools for use within an interface are possible. Parentheses may be used in the embodiment illustrated in FIG. 5.

SUMMARY OF THE INVENTION

According to one embodiment of the present invention, a method of classifying a plurality of records in a database is disclosed. According to this embodiment, a model for ascertaining a characteristic of records in a database is provided. A selected criteria, such as a query or ranking, is formed including a reference to the model. The reference is used to execute the model to score at least one of the plurality of records, and a selected set of records is selected from the database, each record of the selected set satisfying the query. The records in the database may correspond to entities and the method may include steps of gathering entity data and using the selected set of records to determine for which entities perform an action.

According to another embodiment of the present invention, a campaign management system is disclosed. According to this embodiment, the system includes a selection criteria processor to process a selection criteria, wherein resolution of the query requires evaluation of the model. This embodiment further includes a model evaluator, responsive to the selection criteria processor, to evaluate the model. The system may further comprise means for building a campaign, the means for building including means for formulating a query. The model evaluator may comprise means for evaluating the model for fewer than all of the records in the database. The system may further include a model library to provide the model.

According to another embodiment of the present invention, a method of selecting records in a computer database is disclosed. According to this embodiment, a model is provided. A selection criteria is formed to evaluate the records, the selection criteria including a reference to the model. A selected set of records is selected from the plurality of records. During the step of selecting the selected set, the model is evaluated for at least one of the plurality of the records.

According to another embodiment of the present invention, a campaign management system is disclosed. According to this embodiment, the system includes means for receiving a selection criteria that includes a model reference, means responsive to the query for selecting records, and means responsive to the query for resolving the model reference.

According to another embodiment of the present invention, a method of resolving a query for a database storing a plurality of records is disclosed. In this embodiment, the query includes a reference to a model for ascertaining a characteristic of individual records. According to this embodiment, the method includes steps of evaluating the model for fewer than all of the records in the database and resolving the query without evaluating the model for all of the records in the database.

According to another embodiment of the present invention, a method of forming a query of a database is disclosed. According to this embodiment, a library that includes at least one data mining model is provided. The query is constructed using a reference to a selected model in the library.

According to another embodiment of the present invention, a method of using a campaign management system is disclosed. According to this embodiment, the campaign management system is initiated and used to access a model.

BRIEF DESCRIPTION OF THE DRAWINGS

FIG. 4A illustrates one embodiment of a method for performing campaign management.

FIG. 4B illustrates an example of campaign management according to the method of FIG. 4A.

DETAILED DESCRIPTION

In known systems, the data mining and campaign management functions are not integrated. Thus, the fields of the database are defined completely before campaign management has begun. If data mining is to be performed to determine an interesting new field or characteristic for the database, this is performed separately from campaign management. Where a new field is to be used, that field is generated for the entire database. After the field has been generated, the campaign management process begins.

This process can be both time consuming and inefficient. In particular, the separation of data mining and campaign management results in ad hoc systems or systems that lack proper coordination. In addition, it can be difficult to coordinate and combine use of more than one model within a campaign management program. Finally, the process can be inefficient. In some circumstances, significant portions of the database may not need to be scored using a model. In the known art, these records are scored anyway—a potentially time consuming and unnecessary step. Certain embodiments of the present invention can alleviate one or more of these problems, although none of these advantages are essential to all embodiments of the present invention.

Figures 1A, 1B:
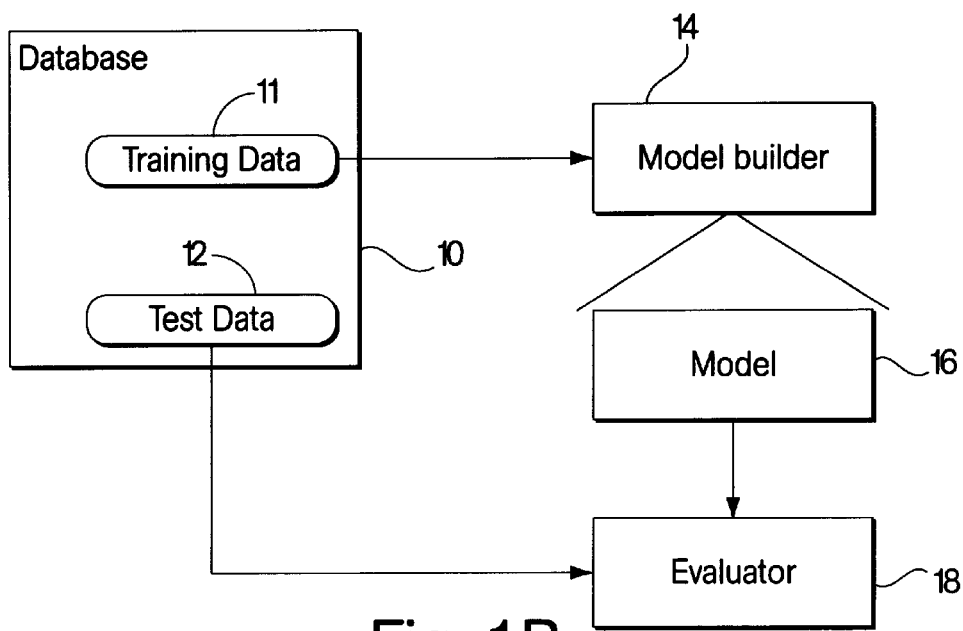
FIG. 1A illustrates an example of a database.
FIG. 1B illustrates one scenario for developing a model.
Figure 2:
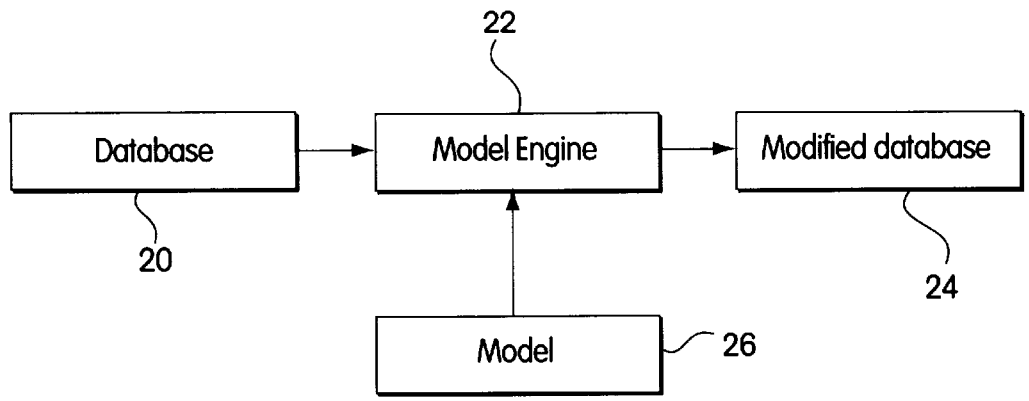
FIG. 2 illustrates one embodiment of using a model to modify a database.
Figure 3:
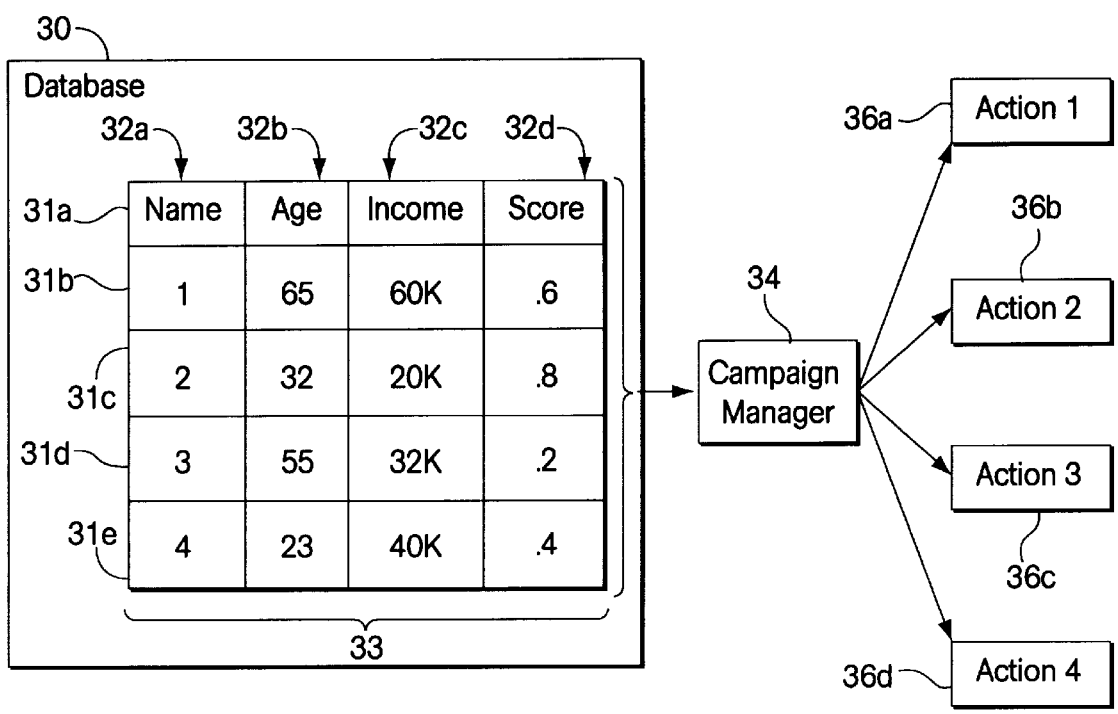
FIG. 3 illustrates an example of use of a campaign manager to perform campaign management.
Figure 6:
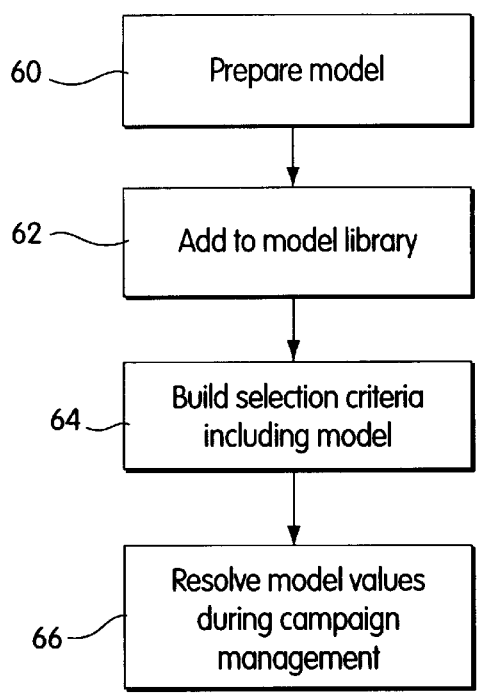
FIG. 6 illustrates one embodiment of a method according to the present invention for performing campaign management including a model for use in generating a field of the database.

FIG. 6 illustrates one embodiment of a method for dynamically resolving model values during campaign management. At a step 60, the model is prepared. This preparation process can proceed according to known techniques. For example, the preparation of the model can be performed by the SAS Enterprise Miner (or other SAS statistical model tools such as SAS/STAT), referred to above. This program permits development of models for scoring a database based on a variety of paradigms, such as a neural-network paradigm, a statistical paradigm, or decision tree. Similarly, other programs such as those described above with reference to FIG. 1B can be used for preparing the model.

At a step 62, the model is added to a model library. This step may correspond to storing whatever parameters are necessary to regenerate and run the model against one or more records in a database. For example, the model could be a segment of executable code that, when executed against a record, generates a score. As just one other example, the model could be a set of values for coefficients of an equation which generates a score when applied to a record in a database.

At a step 64, a selection criteria is built that includes a model reference. In one embodiment, the selection criteria is a query containing a model reference. Building a query may proceed as known in the art for regular field values, with the exception that a model reference is used in place of a field. Thus, for example, a Boolean and/or decision tree can be built for a query with the leaves of the tree including not only field comparisons with other fields or values, but also a comparison of model scores with other fields, model scores or values. The model reference may be any mechanism for using, evaluating or accessing the model, including code for the model, pointers (to code or some other information), model parameters, or any other way to allow evaluation of the model.

At a step 66, the campaign management process is performed, with models being scored during the campaign management process. Thus, rather than resolving the model scores for all of the entries in a database prior to beginning the campaign management process, the model values can be determined during campaign management. In one embodiment, the campaign management process illustrated in FIG. 4A may be used. In this case, the scoring of models can be performed as a part of one of the steps in FIG. 4A (e.g., as a part of beginning the campaign management process at step 40, before or after the de duplication step 42, or during the query at step 44, as described with reference to an embodiment below.)

In another embodiment using the campaign management process illustrated in FIG. 4A, model values may be determined in the split phase 46. In this case, the model score may be used as a selection criteria to rank and then divide the records that have satisfied the query (level 44). For example, a split may divide (split) the records into three groups, based on a model score indicating likelihood of repeat business.

The top third could receive a value proposition corresponding to a twenty five dollar coupon, the middle third could receive a ten dollar coupon and the bottom third could receive only a mailer. In this embodiment, data mining or model scoring may or may not be included in the query phase. (In addition, ranking during the split phase may be done using field characteristics already in the database in addition to, or instead of, model scores.)

During or after the process illustrated in FIG. 6, the model values may be recorded for later use. In a campaign management system using the process illustrated in FIG. 4A, this could be accomplished using the extract level 48. In this case, the extract level 48 would include creating an extract (file saving a segment of the database) that saved model scores. This would permit the score to be saved so that it could be used during subsequent evaluations of the database. For example, it may be desirable to save model scores so that a trend in the model score can be documented. In such a system, the extract level could be used as a mechanism to provide a feedback loop. That is, the extract level may create a file which may then be fed back through the particular campaign management design (or another one).

Figure 7:
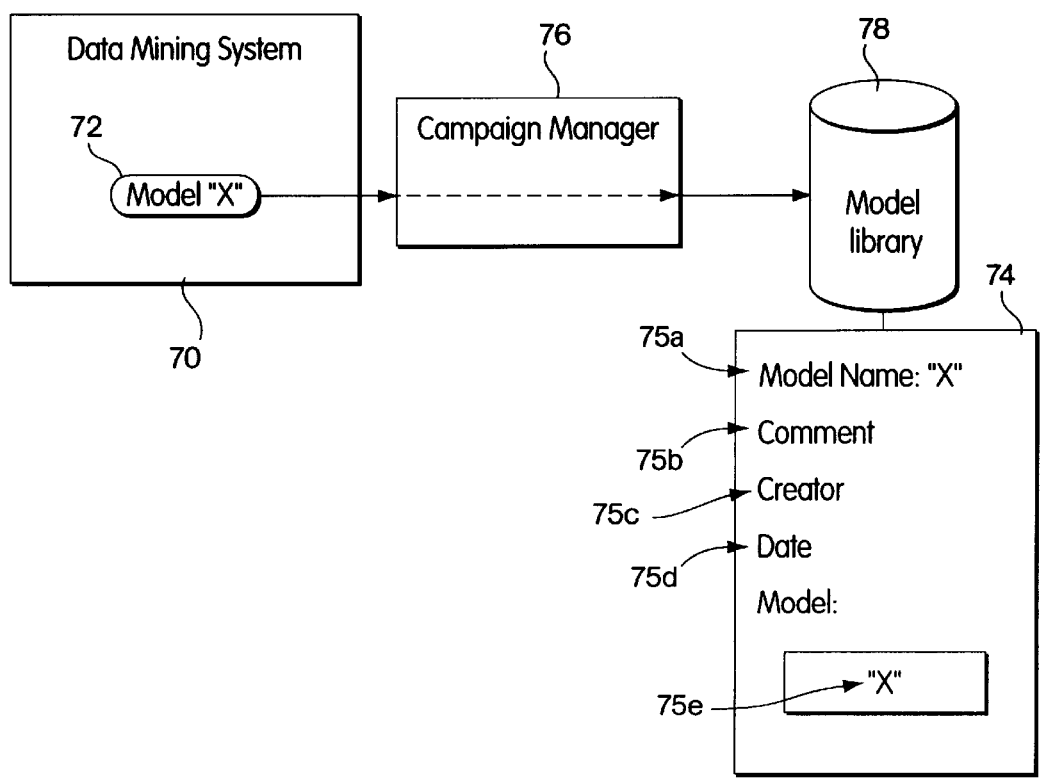
FIG. 7 illustrates one embodiment of a system according to the present invention for performing the method of FIG. 6.

FIG. 7 illustrates one embodiment of a system for performing the method illustrated in FIG. 6. In this embodiment, a data mining system 70 generates a model 72. This generation of models may be done as described above, including with reference to FIG. 1. As described above, the data mining engine can be a software program or package executed on a general purpose or personal computer.

The model 72 is passed to a campaign manager 76. This may be implemented using a simple software interface, allowing the user to select a model (through a model reference) and build a model record 74, as described below. OLE or other mechanisms can be used to automate building the model library 78. The campaign manager 76 may be a separate software module resident on the same computer as the data mining system 70.

The campaign manager 76 may then retain the model in a model library 78. The model library 78 may be a database or data structure storing the models available to the campaign manager. In one embodiment, the models may be stored as data records, e.g., record 74. Such a record could include a variety of fields. For example, a name field 75a could store a value corresponding to a name of the model (here, "X"). A comment field 75b could be included. Thus, the creator of the model (or any other person) could add comments about the model, for example comments about the meaning of scores for the model. Thus, if a model generates scores in a range from zero to one, the creator of the model might indicate that scores above 0.8 indicate a high likelihood that a customer will provide repeat business. A creator field 75c might record information about the creator or the software (e.g data mining system 70) that was used to create the model. Similarly, a date field 75d might record the date the model was created. Other fields may be useful, such as a field in the data record 74 specifying which characteristics of the database (i.e., which fields within a record) are used by the model to generate a score.

A model field 75e may also be included. This field may provide a mechanism for the campaign manager 76 to use the model to score a record in a database table. This field may include executable code. The executable code could be executed, for example, by the campaign manager 76 or passed by the campaign manager 76 to the data mining engine 74 for evaluation by the data mining system 70. The model field 75e might, in the alternative, provide a pointer to a separate area of storage within the model library 78, or to storage associated with the data mining system 70, that includes information necessary to use the model to score database records. That information might be an executable file or parameters for use in conjunction with an executable file that informs the model how to evaluate the score (such as coefficients for an equation).

To the extent that currently available components are used for the data mining engine (e.g., the SAS program described above), passing of information between the data mining system 70 and the campaign manager 76 can be accomplished using standard software interfacing techniques, such as CORBA.

In the embodiment disclosed in FIG. 7, the campaign manager has access to models through the model library 78, e.g., model "X" record 74, stored in the model library 78. Accordingly, a user building a query could specify not only fields within an existing database table, but also a model in a model library for use in generating a value.

Figure 8:
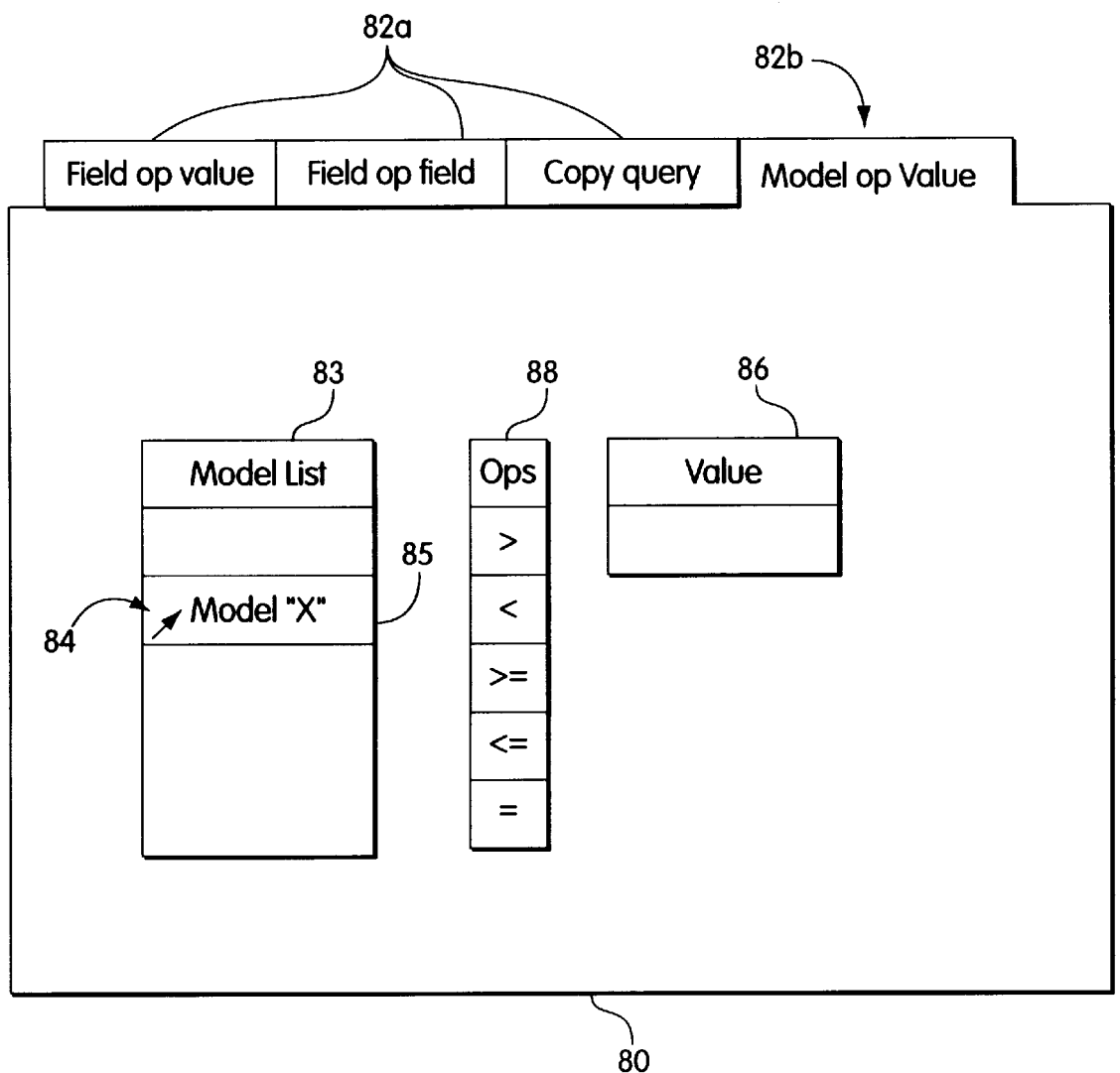
FIG. 8 illustrates one embodiment of a graphical interface that may be used to construct a query that includes a model reference.

FIG. 8 illustrates a tool that may be used for allowing a user to specify a model for use in building a query. In one embodiment, inputting of models for the queries can be done in a manner similar to the way that fields are specified for a table—the only difference being that a reference to a model is made rather than just the field.

Figure 5:
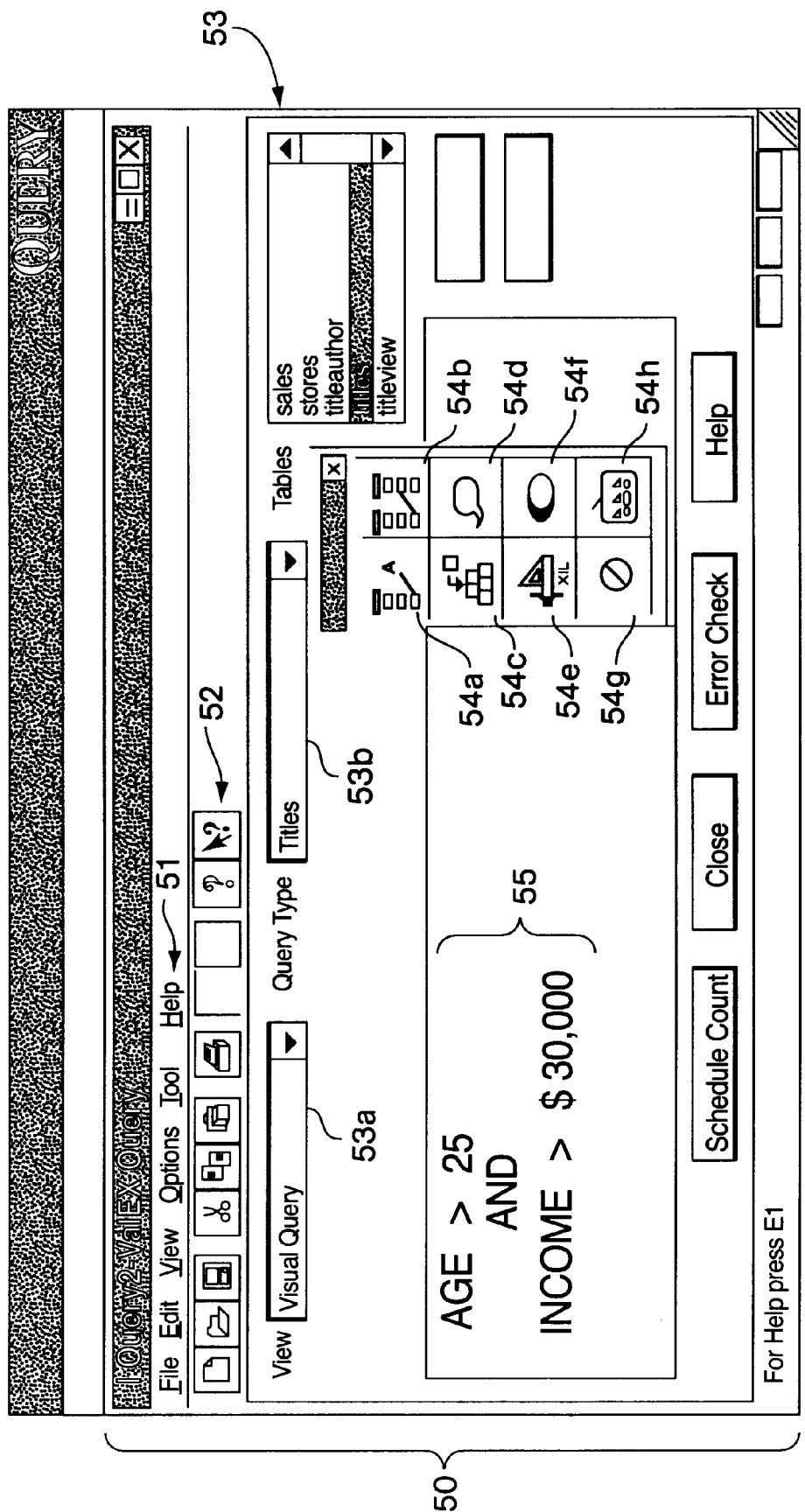
FIG. 5 illustrates one example of a graphical interface for building queries.

In the tool illustrated in FIG. 8, a variety of tabs 82a are included at the top of the tool. These tabs would permit a user to immediately jump to other forms of input for a query. For example, the user might be able to shift to a tool that specifies that the user would like to input a field-operator-value query, i.e., a comparison of a field with a specified value. Alternatively, the user could specify jumping to a tool that permits comparing two field within the database. The tabs 82a and 82b may include all of the various forms of input for the queries, such as each of the buttons described above with reference to FIG. 5.

This particular screen corresponds to a selection of a "model op value" (model-operation-value) portion of the tool, as indicated at tab 82b. This would allow a user to input a portion of a query that compares a model score with a value (analogous to inputting a comparison of a field of a record in the database with a value). Similar tools may be included for specifying model-operation-model and model-operation-field. As just one other example, the model and field tools could be merged into one tool, e.g., permitting a user to select either a field or a model from within the same tool. A variety of other possibilities may be implemented. For some models, for example, a comparison may be made between a model score that generates two values and two input values (or fields). As another example, multiple models could be specified, averaged and compared to an input value.

In the embodiment disclosed in FIG. 8, a model list 83 is included. This may include a list of all of the available models for the query being constructed and may also be selected based on permission codes for users or user groups. In this example, a model "X" is included within the model list, at 85. Thus, a user could select a model for comparison with a value.

Similarly, an operations list may be included. This list could be tailored for the particular model selected at 85. For example, if the output is a numerical score, the operations could be numerical comparison operations. On the other hand, if the model output is a character string, the operations could correspond to operations performed on a character string.

The tool illustrated in FIG. 8 also includes a value field 86. The value field would permit a user to input the appropriate value for comparison with the model score.

Of course many other features could be incorporated into the interface. As one example, a field could be added that shows the current portion of the query being constructed (e.g., model "X" greater than 0.8). Similarly, interface buttons may be included that allow a user to check the syntax of the current query (for example, if the user inputs an incorrect value in the value portion of the screen 86, such as inputting a character string when the output of the model is a numerical score.) Other features could be implemented, for example, viewing (or editing) of a model could be permitted.

In one embodiment of the present invention, the model is run against the database not only as a part of the campaign management process, but also the campaign management process is used to restrict the number of records that are evaluated by the model. (In some embodiments, the user may be permitted to (a) specify whether all models are run against the entire database, (b) specify that only identified models are run against restricted databases or (c) specify that all models should be run against restricted databases.)

In these embodiments, the model record (e.g., 74 of FIG. 7) might also include a field corresponding to the approximate amount of computational time necessary to score an individual record. This could be useful in the embodiment described below, if the user of an automatic query tool wishes to determine how much computational effort is justified to narrow the number of records that need to be scored by the model. If the model compute time is high, greater effort might be justified in restricting the amount or number of records scored using the model.

Figure 9:
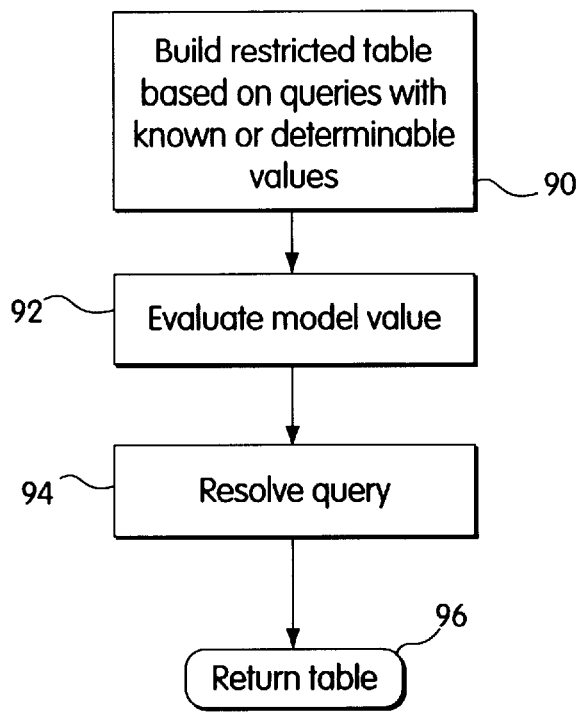
FIG. 9 illustrates one embodiment of the method according to the present invention for dynamically evaluating models during campaign management.

FIG. 9 illustrates one embodiment of a method for restricting the total number of records scored by the model. In this particular embodiment only a single model is included within the particular query to be evaluated. In alternative embodiments, more than one model may be permitted to be included within a query.

At a step 90, a restricted temporary database table is built, using the queries that have known or determinable values. Thus, for example, consider a simple query that requires only the Boolean operation AND of income greater than sixty thousand dollars AND a model score of greater than 0.5. Rather than running the model against all records within the database, a restricted table can first be built using the portion of the query corresponding to income greater than sixty thousand dollars. The model can be run to generate scores only for records that meet the income test. The model need not be evaluated for records not satisfying the income test. This may correspond to a significant of savings of time, particularly for models that are computation intensive or where processing a part of the query substantially reduces the number of records that need to be scored by the model.

Similarly, consider a simple "OR" of income greater than sixty thousand dollars OR model score greater than 0.8. Here, the model need not be scored against any record that does satisfy the income test (it will be included no matter what the model score is). Accordingly, a restricted table could be built by removing those records satisfying the income test from a restricted table used for model evaluation. In this case, when the restricted table is built, the OR query could first be formulated at a temporary table storing the results of the first portion of the query (here, income) stored. The remainder of the table could then be scored by the model to produce a second table. The result of the overall simple query would then be the records included in both of the tables.

As described with reference to these two examples (and illustrated in FIGS. 10A–10D, discussed below), the process of building the restricted table may correspond to parsing the query to determine which records may require scoring by the model. Thus, if a portion of the query is in an "AND" clause with the model, only records satisfying that portion of the query need to be evaluated by the model. For portions of a query that are "OR"-ed with the model query, only records that do not satisfy the OR query need to be scored by the model. For the OR function, the restricted table may be built in conjunction with the query forming the table to be used as the OR (i.e., records that satisfy the OR portion of the query being saved in one table while records that do not satisfy the OR portion being saved in a second table). In the alternative, the restricted table may be determined by constructing a separate query or queries to form that table.

In another embodiment, the user may be required to specify what segment of the database (e.g., query elements) are to be used to build the restricted table.

After the step 90 of building a restricted table for evaluation by the model, a step 92 of actually evaluating the model may be performed. Here the model is scored for those records in the restricted table built at step 90.

As generally described above, the query may be resolved using the model scores, at a step 94. At a step 96, processing is complete and the results of the query can be returned.

Figure 10A:
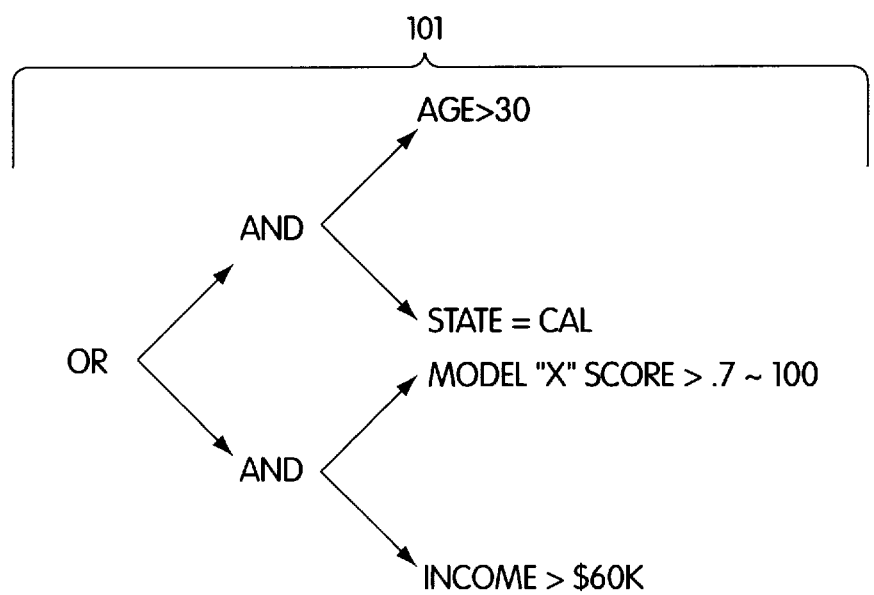
FIG. 10A illustrates an example of a query that includes a model reference.

FIG. 10A illustrates an example of a fuller query that includes a model query 100. The decision tree 101 corresponds to the Boolean expression ("age greater than 30" AND "state=cal") OR ("model 'X' score greater than 0.7" AND "income greater than sixty thousand dollars").

Figure 10B:
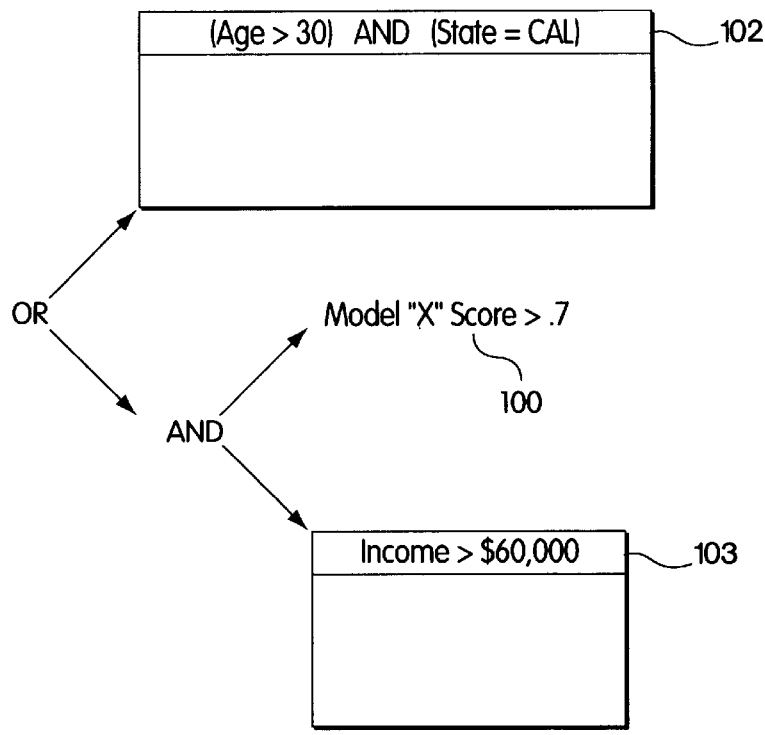
FIG. 10B illustrates the example of FIG. 10B, with partial results.

FIG. 10B is an example of partial results in the process of building a restricted table for evaluation by the model "X" and the query of FIG. 10A. First, the known or determinable portions of the query are evaluated. Accordingly, a table 102 is built that includes only those records that meet the (age greater than 30) and (state=cal) portion of the query. This table may include either the entire record, or only a "tag," i.e., an identifier for the corresponding record (e.g., in a database including customers, social security number or the unique name of the customer could be used as a "tag"; when processing is complete, the other fields of the record necessary for further action could be determined from a larger table using the table with the tag id's for identifying the records that include the larger set of fields).

Similarly, a table 103 may be built including those records that satisfy the (income greater than sixty thousand dollars) test.

Figure 10C:
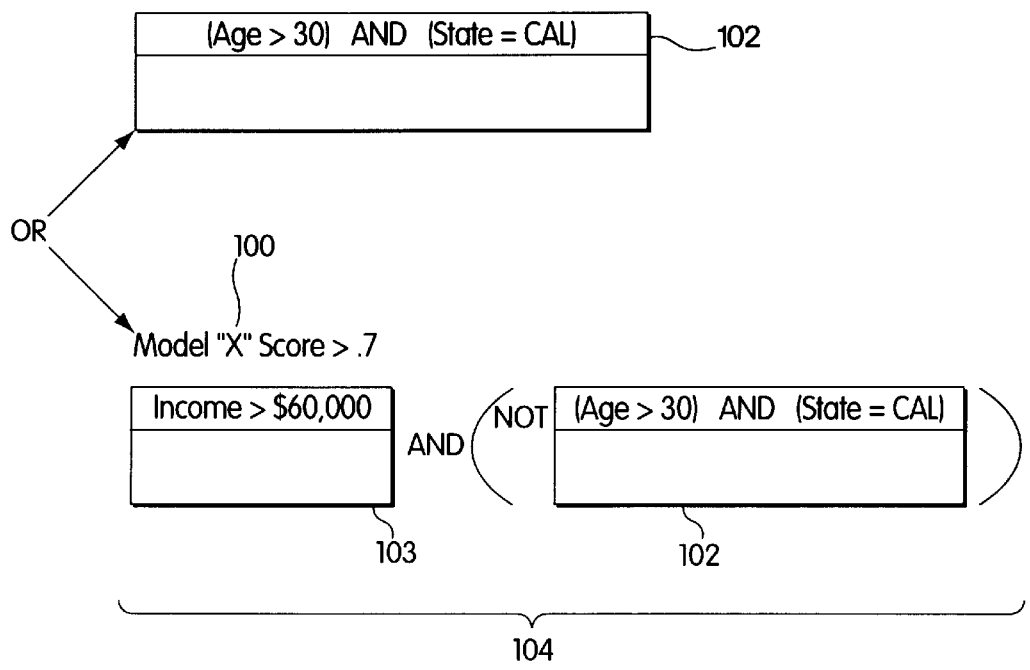
FIG. 10C illustrates an example of generating a restricted table for dynamic evaluation of a model.

FIG. 10C illustrates evaluation of the model 100, against a restricted table (generated as shown at 104). In particular, the income table is AND'ed with records that are not in the table 102. (In other embodiments, more limited forms of restricting the inputs for the model could be used, for example, only restricting the model to evaluation of records satisfying any other queries within an immediate AND clause; in FIG. 10A, this would correspond to generating the restricted table based only on the (income>$60k) test.)

After the model is evaluated, the remainder of the query can be performed—i.e., a table can be built including records that only have a model score of greater than 0.7. Once the query has been evaluated, these tables may be deleted, if desired.

Finally, the query can be resolved (step 94 above). In this example, this would correspond to combining the table 102 with the result of the table built based on the model score being greater than 0.7.

Figure 10D:
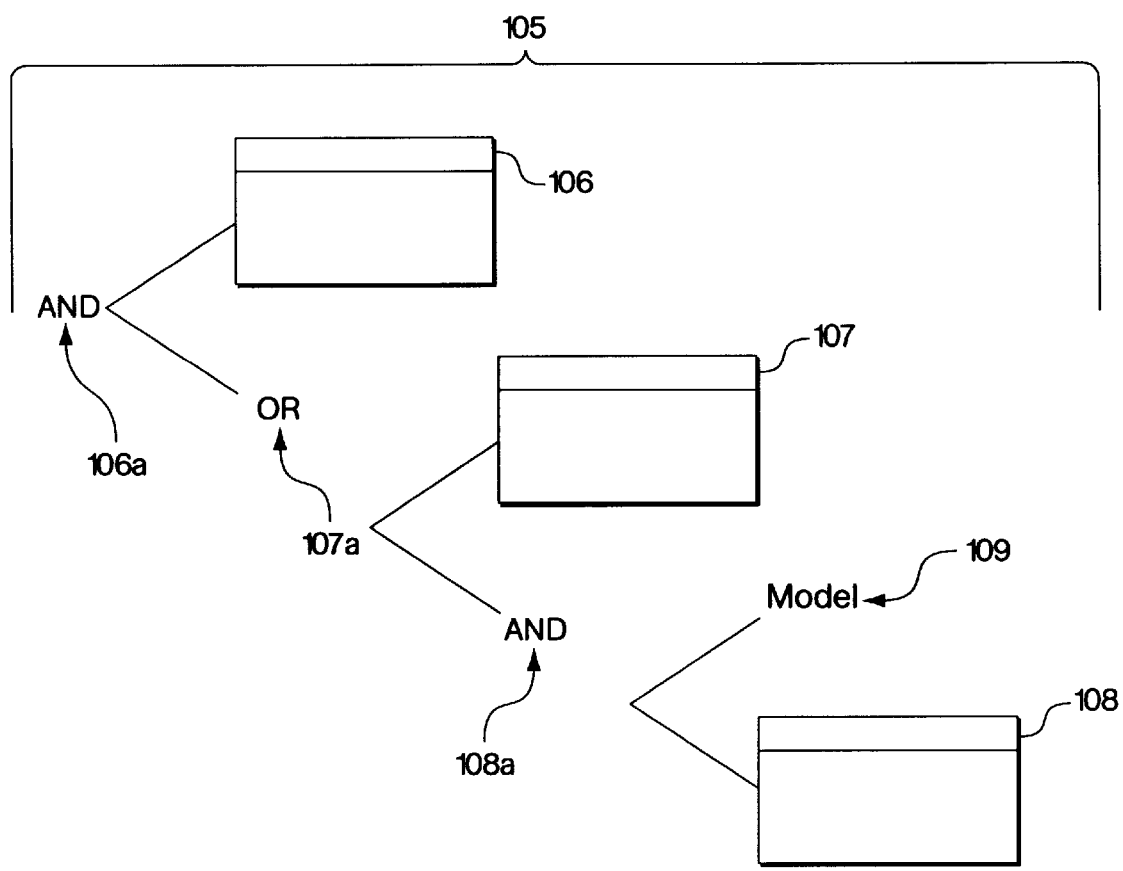
FIG. 10D illustrates an example of a query including a model reference.

FIG. 10D illustrates another example of a query 105 that includes a model reference 109. In this example, a table 106 corresponds to a table built by resolving the corresponding portion of the Boolean tree. This may include other query elements directly connected in the tree at 106a, or query elements in a subtree of 106a. Thus, all determinable queries (elements and subtrees) input to AND node 106a are resolved into table 106. Similarly, all OR components (elements and subtrees) may be combined into a table 107, as a result of the OR node 107a. This would include all sub-trees within OR 107a (except for the AND 108a). Finally, a table 108 may be constructed using all query elements in sub-trees connected to the AND node 108a. A restrictive table may be built for running the model 109 by combining tables 106–108. In particular, the model need only be run for records that appear in both table 106 and table 108, but not in table 107. (In other embodiments, an SQL query may be generated to produce the restricted table.) Partial results (e.g., tables 106, 107 and 108) may be saved for processing the query or building restricted tables for other models.

Figure 11:
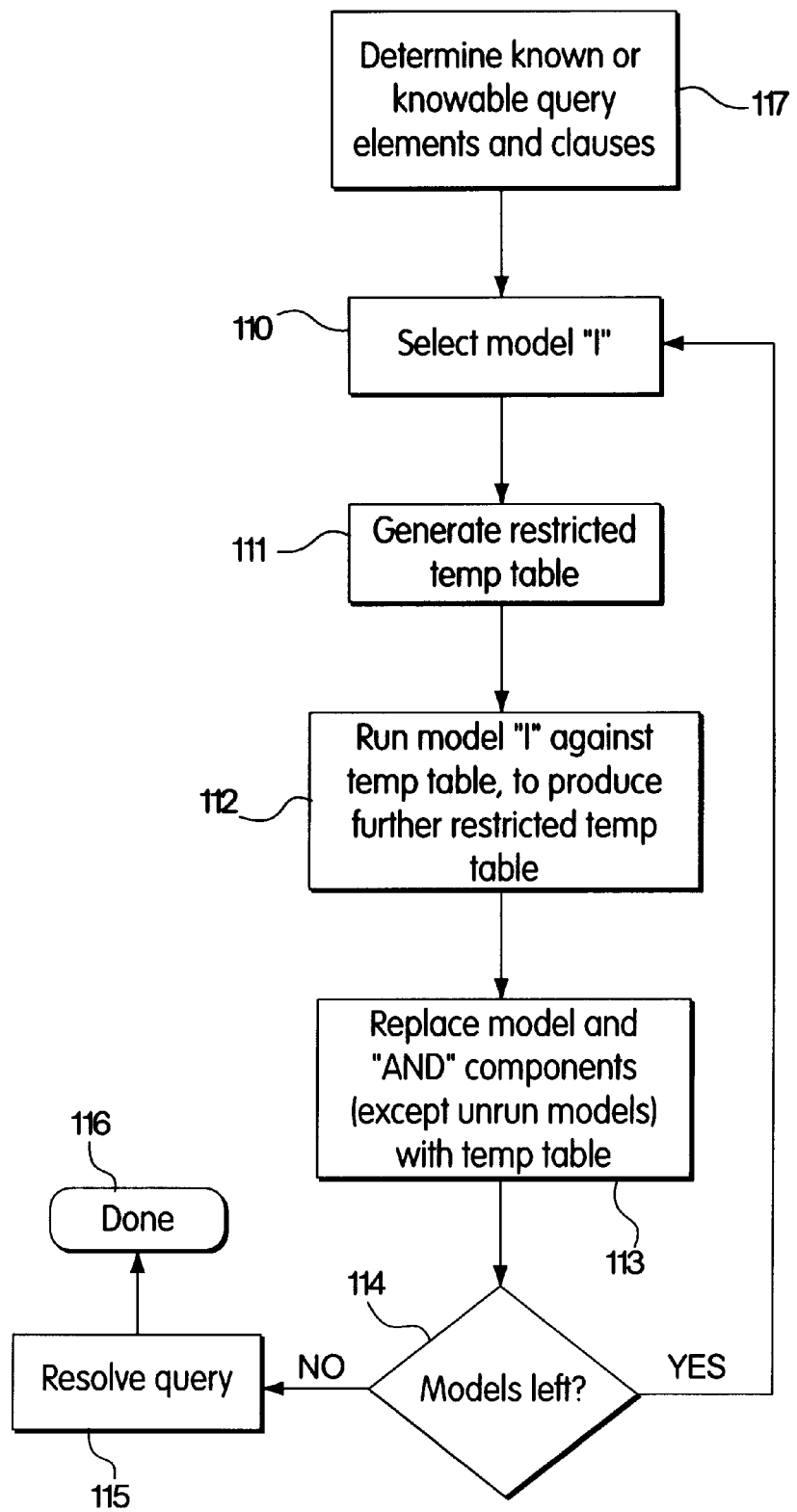
FIG. 11 illustrates one embodiment of a method according to the present invention for dynamically evaluating models during campaign management.

FIG. 11 illustrates one embodiment of dynamic evaluation of a database where multiple models may be included within a query.

At a step 117, the known or knowable query elements are determined. Thus, the query elements that rely upon only fields of the database are resolved. Similarly, AND/OR and NOT clauses related to these may be resolved (where no model is relied upon for resolving the clause). The result can be the equivalent of a Boolean tree that included tables for query elements that are known or knowable, and model references. One example of such a tree is illustrated in FIG. 10B, with tables 102 and 103 generated and a model reference 100 remaining.

At a step 110, one of the models within the query is selected for evaluation. This selection may be done randomly. In the alternative, the user could input the order of models for selection. In another embodiment, the campaign manager could automatically select the order of models. The selection could be based, for example, on the anticipated computation time for scoring an individual record. Thus, those models that require less computation time may be selected before models which require greater computation time.

At a step 111, a restricted table is generated for the selected model "I". This may be done as described above with reference to FIGS. 9 and 10A–10D, with the following exception. The particular query tree being examined may include not only tables but other model references. For each other unresolved model reference, the model is assumed to be that value which would correspond to including more members in the restricted table. For example, if two model references are included within an AND clause, the unevaluated model is assumed to be true for all records. Thus, that model does not serve to restrict those inputs placed in the restricted temporary table for evaluation by model "I" at step 112, described below. Similarly, if two models are part of an OR clause, the model not being evaluated is assumed to be false for all records—again resulting in no records being removed from what is evaluated by model "I". (While this embodiment and the embodiments described above are referred to as Boolean trees, this could of course be done at the Boolean equation level, various methods and procedures for manipulating both Boolean trees and Boolean equations being generally known in the art.)

At a step 112, the selected model "I" is run against the restricted temporary table. The result is the building of a further restricted temporary table using the model element of the query. This step 112, corresponds generally to the running of model X in FIG. 10C against the restricted table built at 104, followed by selecting only those entries that have a score greater than 0.7.

At a step 113, the model and resolved "AND" components (i.e., not portions of any model that has not been run) are replaced in the Boolean tree. Again, referring to FIG. 10C the entire model query 100 can be replaced with the result of generating the temporary table. Because the model was only run against elements satisfying the other components of an AND clause, the resulting table already takes into account those elements of the query.

At a step 114 it is determined whether there are any unevaluated models left. If so, processing continues at step 110 where another model is selected. If not, any remaining steps for resolving the query are performed, as described above with reference to FIG. 9. After this is done, processing is complete at step 116.

Other embodiments within the scope of the present invention might form restricted temporary tables in different manners. For example, temporary tables could be formed and used based only on field level inquiries within the same AND clause (ignoring all other model references and OR references). This would be simpler and easier to implement, but may require execution of the model for more records than is necessary. Whether this results in a computational savings or not may depend on the individual query and the amount of time necessary for the model to score a record within the database.

In the above described embodiments, tracking codes may be added and associated with records in the database. Each tracking code constitutes information about how the record was processed during campaign management. Thus, in the campaign management model illustrated in FIG. 4A, a tracking code could be incorporated for each record stating what branch the campaign management process was followed for each record. In FIG. 4B, every record passed to extract 1 48a would include a tracking code indicating that it pass through (for example) steps 42a, 44a, 46a, 47a and 48a. The tracking codes may be included as a new field in a table for the database, or in a new database having a unique key associated with each record in the new table. These tracking codes may also include model scores as described above.

Figure 12:
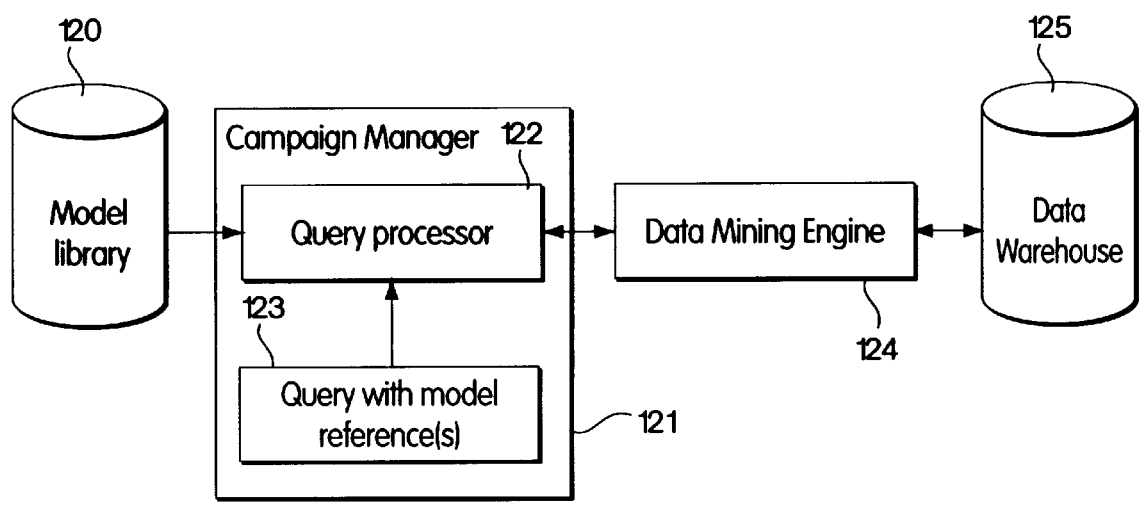
FIG. 12 illustrates one embodiment of a system according to the present invention.

FIG. 12 illustrates one embodiment of a system that may be used to implement the above methods.

In this embodiment, the campaign manager 121 oversees and performs the campaign management functions, using the other elements of the system 120, 124 and 125. As above, the campaign manager can be implemented in software running on a general purpose computer or personal computer.

A model library 120 may be available to the campaign manager 121. The model library 120 includes one or more models that can be used in evaluating a query in the campaign management function. The model library 120 may include models built and/or stored according to one of the methods generally described above.

The campaign manager 121 may include (in addition to other components for performing the campaign management functions described above (not shown)), a query processor 122. In this embodiment, the query processor is responsible for controlling evaluation of a query, e.g., parsing a Boolean tree as generally described above. When being used, a query with model reference or references 123 may be input into the query processor.

A data mining engine 124 may be provided. In this embodiment, a data warehouse or database 125 may be included and coupled directly to the data mining engine 124. In this embodiment, the data warehouse 125 stores the database tables, e.g., all of the tables storing customer information for a marketing campaign.

In this particular embodiment, the data mining engine 124 is responsible for both querying the database with respect to elements of the database and for evaluating model scores. The data mining engine 124 can be software running on a general purpose computer or a personal computer. (In other embodiments, querying may be performed by the query processor 122 or some other component, with the determining engine scoring only those records passed to the data mining engine 124 by the query processor 122).

Resolution of queries may be performed using the system illustrated in FIG. 12 in the following manner. The selection criteria, or query, processor 122 can begin by receiving the complete query (e.g. a query such as the one illustrated in FIG. 10A). The query processor can then formulate the queries into those necessary to resolve known or determinable query elements. For example, a query processor 122 could formulate a query of (age greater than 30) AND (state=cal) in order to construct the temporary table 102 of FIG. 10B. That query could be passed to the data mining engine 124 which would then formulate and evaluate the corresponding query in the data warehouse 125. The result may be the corresponding table (102 of FIG. 10B) (which may be formulated as a tag table). Similarly in FIG. 10B, the query processor 122 could formulate the (income greater than sixty thousand dollars) query for the database, pass that query to the data mining engine 124, which would then formulate the temporary table 103.

The query processor 122 could then determine how to formulate the restricted table for evaluation by the applicable model (e.g., determine the necessary steps to formulate the temporary table for evaluation of model "X" 100).

The query processor may then formulate (or pass a command to have the data mining engine formulate) the restricted table that the model will evaluate. The query processor 122 may then pass the applicable model together with the restricted temporary table (or a pointer to this information) to the data mining engine 124. The data mining engine 124 may then both evaluate the scores of the model and further process the models scores to produce a temporary table that includes only records satisfying the query element involving the model (e.g. the query element 100 of FIG. 10B). This resulting table may then be passed back to the query processor 122 for further processing.

Similarly, the final step of resolving the queries may be performed by the query processor 122, with or without using the data mining engine 124 for performing database table operations (such as join).

In a system including ranking based on model scores, the selection criteria, or query, processor 122 may similarly invoke the data mining engine 124 to process the model reference.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of classifying a plurality records in a database, the method comprising steps of:
   (a) providing a first model for ascertaining a first characteristic of individual ones of the records;
   (b) forming a selection criteria, the selection criteria including a reference to the first model, wherein the step (b) comprises a step of forming a query, the query including the reference to the first model;
   (c) using the reference to execute the first model to generate a value for the first characteristic at least one of the plurality of records; and
   (d) selecting a selected set of the records, each record of the selected set satisfying the selection criteria.

2. A method of classifying a plurality records in a database, the method comprising steps of:
   (a) providing a first model for ascertaining a first characteristic of individual ones of the records;
   (b) forming a selection criteria, the selection criteria including a reference to the first model;
   (c) using the reference to execute the first model to generate a value for the first characteristic at least one of the plurality of records; and
   (d) selecting a selected set of the records, each record of the selected set satisfying the selection criteria, wherein the step (d) comprises a step of ranking the records.

3. A method of classifying a plurality records in a database, the method comprising steps of:
   (a) providing a first model for ascertaining a first characteristic of individual ones of the records;
   (b) forming a selection criteria, the selection criteria including a reference to the first model;
   (c) using the reference to execute the first model to generate a value for the first characteristic at least one of the plurality of records; and
   (d) selecting a selected set of the records, each record of the selected set satisfying the selection criteria;
   wherein the records correspond to entities and the method further comprises steps of:
   gathering entity data for a plurality of entities to include in the database, each record in the database corresponding to one of the entities; and
   using the selected set of records to determine for which of the entities to perform a corresponding action.

4. A method of classifying a plurality records in a database, the method comprising steps of:
   (a) providing a first model for ascertaining a first characteristic of individual ones of the records;
   (b) forming a selection criteria, the selection criteria including a reference to the first model, and wherein the step (b) comprises a step of
   forming a query to select the records, the query including the reference to the first model and a reference to the second model;
   (c) using the reference to execute the first model to generate a value for the first characteristic at least one of the plurality of records; and
   (d) selecting a selected set of the records, each record of the selected set satisfying the selection criteria;
   further comprising a step of:
   providing a second model for ascertaining a second characteristic of individual ones of the records.

5. A method of classifying a plurality records in a database, the method comprising steps of:

(a) providing a first model for ascertaining a first characteristic of individual ones of the records;

(b) forming a selection criteria, the selection criteria including a reference to the first model;

(c) using the reference to execute the first model to generate a value for the first characteristic at least one of the plurality of records, wherein:

the step (c) comprises a step of (e) evaluating the first model for fewer than all of the records in the database; and (d) selecting a selected set of the records, each record of the selected set satisfying the selection criteria, wherein the step (d) comprises a step of (f) resolving the selection criteria without evaluating the first model for all of the records in the database.

6. The method of claim 5, wherein the step (e) comprises steps of:

(g) building a model evaluation database, the model evaluation database including a subset of the records of the database; and evaluating the first model only for the records in the model evaluation database.

7. The method of claim 6, wherein the selection criteria is a query and the step (g) comprises a step of evaluating a portion of a query.

8. A campaign management system to classify records in a database, the system comprising:

a selection criteria processor to process a selection criteria, wherein resolution of the selection criteria requires evaluation of a model;

a model evaluator, responsive to the selection criteria processor, to evaluate the model; and means for building a campaign; and wherein the means for building comprising means for formulating the selection criteria.

9. The system of claim 8, further comprising:

a model library to provide the model.

10. A campaign management system to classify records in a database, the system comprising:

a selection criteria processor to process a selection criteria, wherein resolution of the selection criteria requires evaluation of a model; and a model evaluator, responsive to the selection criteria processor, to evaluate the model;

wherein:

the model evaluator comprises means for evaluating the model for fewer than all of the records in the database; and the selection criteria processor comprises means for resolving a query including a reference to the model, without evaluating the model for all of the records in the database.

11. The system of claim 10, wherein the means for resolving comprises:

means for building a model evaluation database, the model evaluation database including a subset of the records of the database and having fewer records than the database; and means for evaluating the model only for the records in the model evaluation database.

12. A campaign management system to classify records in a database, the system comprising:

a selection criteria processor to process a selection criteria, wherein resolution of the selection criteria requires evaluation of a model;

a model evaluator, responsive to the selection criteria processor, to evaluate the model; and a model library to provide the model.

13. A method of selecting records in a computer database storing a plurality of records, the method comprising steps of:

(a) providing a model for ascertaining a characteristic of individual ones of the records;

(b) forming a query to evaluate the records, the query including a reference to the model, wherein the query includes a plurality of elements, one of the elements including the reference to the model;

(c) selecting a selected set of records from the plurality of records, each record of the selected set satisfying the query, wherein the step (c) comprises a step of (e) resolving at least one of the elements before the step (d); and (d) during the step (c), evaluating the model for at least one of the plurality of records, wherein the step (d) comprises steps of forming a restricted group of the records based on the step (e), the restricted group including less than all of the records in the database, and evaluating the model only for the records in the restricted group.

14. The method of claim 13, wherein:

the at least one element resolved in step (e) is in the query as part of an AND clause including the model reference; and the step (c) further comprises steps of removing records from the restricted group that do not satisfy the element including the reference to the model, and using the restricted group with removed records as a partial result for resolution of the AND clause.

15. A campaign management system to classify a plurality of records in a database, the system comprising:

means for receiving a selection criteria that includes a model reference; means, responsive to the selection criteria, for selecting a selected set of records from the plurality of records, each record of the selected set of records satisfying the query, wherein the means for selecting comprises means for resolving at least one of a plurality of elements in a query, before resolving the model reference; and means, responsive to the selection criteria, for resolving the model reference to produce a model value for at least one of the plurality of records, wherein the means for resolving the model reference comprises means, responsive to the means for resolving at least one of a plurality of elements, for forming a restricted group of the records, and means for determining the model values only for the records in the restricted group.

16. A method of resolving a selection criteria for a database storing a plurality of records, the selection criteria including a reference to a model for ascertaining a characteristic of individual ones of the records, the method comprising steps of:

(a) evaluating the model for a restricted set of the records in the database;

(b) resolving the selection criteria without evaluating the model for all of the records in the database, to produce a selected set of the records; and (c) saving the result of evaluating the model.

17. A method of resolving a selection criteria for a database storing a plurality of records, the selection criteria including a reference to a model for ascertaining a characteristic of individual ones of the records, the method comprising steps of:
- (a) evaluating the model for a restricted set of the records in the database wherein the records correspond to entities;
- (b) resolving the selection criteria without evaluating the model for all of the records in the database, to produce a selected set of the records; and
- (c) gathering entity data for a plurality of entities to include in the database, each record in the database corresponding to one of the entities; and
- (d) using the selected set of records to determine for which of the entities to perform a corresponding action.

18. A method of resolving a selection criteria for a database storing a plurality of records, the selection criteria including a reference to a model for ascertaining a characteristic of individual ones of the records, the method comprising steps of:
- (a) evaluating the model for a restricted set of the records in the database, wherein the step (a) comprises steps of:
- (c) building a model evaluation database, the model evaluation database including a subset of the records of the database; and
- (d) evaluating the model only for the records in the model evaluation database; and
- (b) resolving the selection criteria without evaluating the model for all of the records in the database, to produce a selected set of the records, wherein the selection criteria is a query.

19. The method of claim 18, wherein the records correspond to entities and the method further comprises steps of:
gathering entity data for a plurality of entities to include in the database, each record in the database corresponding to one of the entities; and
using the selected set of records to determine for which of the entities to perform an action.

20. The method of claim 18, wherein:
the query includes a first element test, the first element test being related to the reference through an AND relationship in the query; and
the step (c) comprises a step of
identifying the records of the database that meet the first element test.

21. The method of claim 20, wherein:
the query includes a second element test, the second element test being related to the reference through an OR relationship in the query; and
the step (c) comprises a step of
identifying the records of the database that do not meet the second element test.

22. The method of claim 18, wherein:
the query includes an element test, the element test being related to the reference through an OR relationship in the query; and
the step (c) comprises a step of
identifying the records of the database that do not meet the element test.

23. A method of forming a selection criteria for a database including a plurality of records, the method comprising steps of:
providing a library including at least one data mining model used to score the records in the database;
selecting at least one data mining model for use in the selection criteria; and
constructing the selection criteria using a reference to the selected data mining model, wherein the selection criteria is a query.

24. A method of forming a selection criteria for a database including a plurality of records, the method comprising steps of:
providing a library including at least one data mining model used to score the records in the database;
selecting at least one data mining model for use in the selection criteria; and
constructing the selection criteria using a reference to the selected data mining model, wherein the reference is stored in a physical medium in a format selected from the group consisting of: program code for the model, a pointer to another location in a second physical medium, corresponding to program code for the model, and a set of parameters for evaluation of the model.

25. A method of using a campaign management system, comprising steps of:
- (a) initiating the campaign management system;
- (b) using the campaign management system to access a model, wherein the step (b) comprises a step of providing a reference to the model; and
- (c) scoring records in a database using the model.

26. A method of using a campaign management system, comprising steps of:
- (a) initiating the campaign management system;
- (b) using the campaign management system to access a model;
- (c) scoring records in a database using the model; and
- (d) providing a model library, the model library including a reference to the model.

27. The method of claim 24, wherein the reference is stored in a physical medium in a format selected from the group consisting of: program code for the model, a pointer to another location in a second physical medium, corresponding to program code for the model, and a set of parameters for evaluation of the model.

* * * * *